B. H. HICKOK.
Gate.
No. 219,261.                                          Patented Sept. 2, 1879.
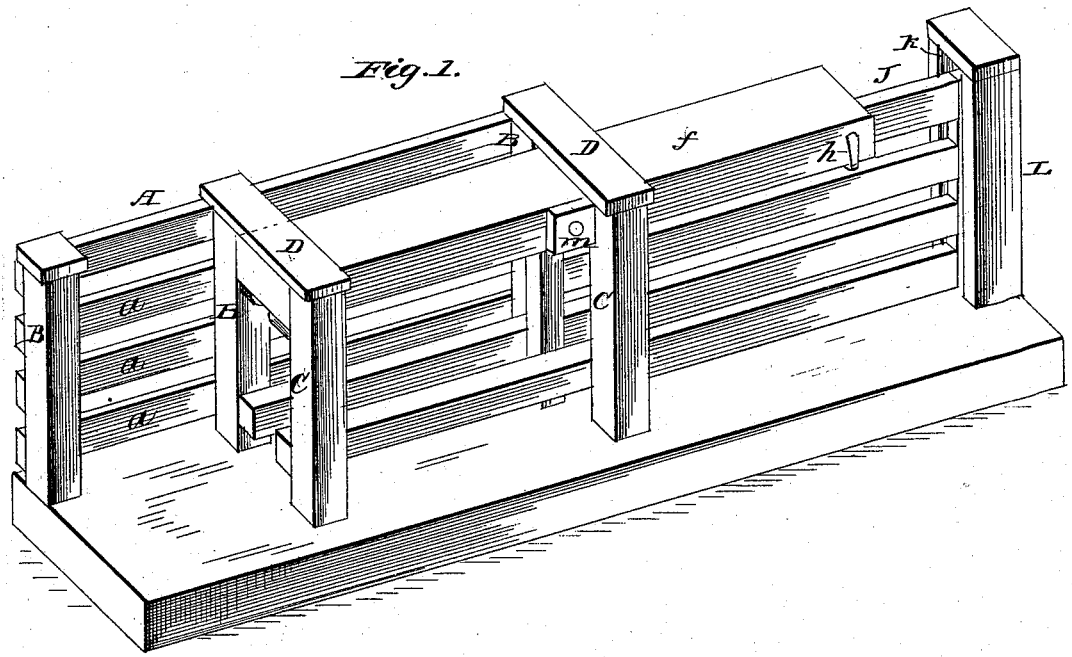
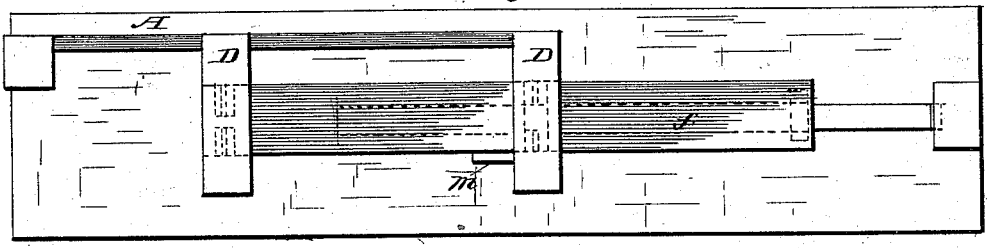
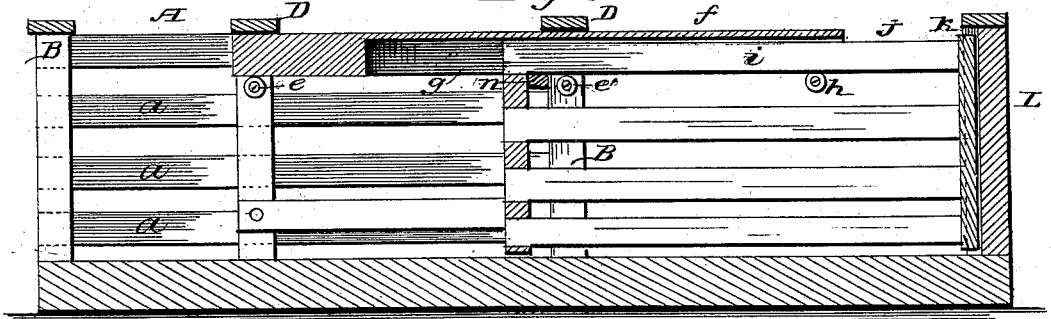
Witnesses
Fred. G. Dieterich
George Binkenburg
Inventor
Barton Harris Hickok
By J. J. Johnston
his attorney

UNITED STATES PATENT OFFICE.

BARTON H. HICKOK, OF CHICAGO, ILLINOIS.

IMPROVEMENT IN GATES.

Specification forming part of Letters Patent No. 219,261, dated September 2, 1879; application filed January 8, 1879.

*To all whom it may concern:*

Be it known that I, BARTON HARRIS HICKOK, of Chicago, in the county of Cook and State of Illinois, have invented certain new and useful Improvements in Gates; and I do hereby declare the following to be a full, clear, and exact description of the same, reference being made to the accompanying drawings, forming a part of this specification, and in which—

Figure 1 is a perspective view of my improved gate. Fig. 2 is a top-plan view of the gate. Fig. 3 is a longitudinal vertical section of the gate.

This invention relates to improvements in the class of suspended sliding gates that will slide easy and true and without sagging; and the invention consists in a grooved sliding bar, in which grooved bar, upon friction-rollers, moves the upper rail of the gate, one of said friction-rollers being secured to the front end of said bar, and the others between the posts of the gate-frame, the grooved bar moving upon the latter rollers, and furnished with stops for limiting its movement, the whole being so constructed and arranged that the gate may be opened so as to provide a wide or narrow passage-way, as may be desired, the travel of the gate in the grooved bar being limited.

To enable others skilled in the art to make and use my invention, I will now proceed to describe the exact manner in which it is carried out.

In the drawings, A represents an ordinary panel of a fence, consisting of bars $a$ and posts B, and opposite of two of said posts B are posts C, said posts B C being connected at their upper ends by cross-bars D. Between the posts B C are journaled friction-rollers $e\ e'$, and above said friction-rollers, and below the cross-bars D, is placed a bar, $f$, provided with a groove, $g$, and a friction-roller, $h$. In the groove $g$ of the bar $f$, above the friction-rollers $h$ and $e'$, is placed the upper bar, $i$, of the gate J, which gate is susceptible of longitudinal movement, and the front end of which enters a groove or recess, $k$, in the gate-post $l$.

The bar $f$ is provided with a stop, $m$, to limit its movement, and a cross-bar, $n$, to prevent the back end of the gate from sagging when moving it backward in the bar $f$, the groove in said bar in which the gate moves limiting the travel or movement of the gate.

The construction of my improvement in gates and ways being readily understood from the foregoing description and the accompanying drawings, I will proceed to describe its operation, which is as follows:

The bar $f$ moves longitudinally on the friction-rollers $e\ e'$, and the gate J moves longitudinally in the groove $g$ of said bar $f$ upon the friction-rollers $e'$ and $h$.

In closing the gate the bar $f$ is moved toward the post L until the stop $m$ comes against the forward post, C, the gate J being then moved forward until the front end thereof enters the groove or recess $k$ in the post $l$, as shown in Fig. 3. When in this position the gate may be opened by moving it backward in the grooved bar $f$, thereby forming a narrow gateway, as shown in Fig. 1, from which point a large passage or gateway may be provided by moving both the gate and grooved bar backward simultaneously.

By having the gate suspended on rollers, as shown, I obviate the use of rails, which obstruct the passage-way, as is the case in the class of sliding gates supported on grooved rollers running on rails, thus materially simplifying the construction of the gate, while the grooved bar at the top protects the rollers from rain or snow, and consequently obviates any excess of friction by their becoming rusty by being left exposed.

I am aware that sliding gates suspended and supported on rollers are old, and such I do not desire to be understood as claiming, broadly, as my invention; but

I claim as my invention—

1. In a farm-gate, the bar $f$, provided with a groove, $g$, and friction-roller $h$, said bar being suspended on friction-rollers $e\ e'$ between the posts B C of the gate-frame, in combination with the gate J, substantially as and for the purpose herein shown and described.

2. In a sliding farm-gate, the combination, with the gate J and gate-frame, of the suspended and sliding grooved bar $f\ g$, provided with the front friction-roller $h$, cross-bar $n$, and stop $m$, substantially as and for the purpose herein shown and described.

BARTON HARRIS HICKOK.

Witnesses:
 A. B. ELLITHORPE,
 W. S. COFFMAN.